US006556561B1

United States Patent
Himbeault et al.

(10) Patent No.: US 6,556,561 B1
(45) Date of Patent: Apr. 29, 2003

(54) DATA NETWORK FOR REAL TIME INFORMATION

(75) Inventors: Lee C. Himbeault, Calgary (CA); Martin Wollensak, Nepean (CA); Paul Andrew Senyshyn, Nepean (CA)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/223,991

(22) Filed: Dec. 31, 1998

(51) Int. Cl.[7] .................... H04L 12/66; H04L 12/413
(52) U.S. Cl. ............................ 370/352; 370/445
(58) Field of Search ................. 370/235, 237, 370/352, 353, 356, 363, 445, 461, 456, 459, 462

(56) References Cited

U.S. PATENT DOCUMENTS 6,161,134 A * 12/2000 Wang et al. ............ 709/220
6,215,797 B1 * 4/2001 Fellman et al. ......... 370/503

OTHER PUBLICATIONS

Jia, F., et al., "The superchannel scheme for integrated services on multiple access broadcast networks", Computer Networks and ISDN Systems, 27 (11), Elsevier Science B.V., pp. 1523–1543, (1995).

Ulusoy, O., "Network access protocol for hard real–time communication systems", Computer Communications, 18 (12), Elsevier Science B.V., pp. 943–948, (Dec. 1995).

* cited by examiner

Primary Examiner—Wellington Chin
Assistant Examiner—Brenda Pham
(74) Attorney, Agent, or Firm—Schwegman, Lundberg, Woessner & Kluth, P.A.

(57) ABSTRACT

A node on a collision detection protocol based network forces collisions to gain control of the network when it has real time data that needs to be transferred to another node on the network, and then begins transmitting the real time data prior to other nodes gaining control of the network. Each node which has real time data to transfer keeps track of a maximum wait time parameter to determine when the real time data must be transferred to ensure it arrives at a destination on time. As the maximum wait time is approached, the node forces a collision by transmitting even though it senses another node is already transmitting to force the network into a quiet mode. It then starts transmitting the real time data prior to other nodes beginning transmission.

20 Claims, 2 Drawing Sheets

DATA NETWORK FOR REAL TIME INFORMATION

FIELD OF THE INVENTION

This invention relates generally to the field of data networks, and in particular to the enhancement of such networks to handle real time information.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright ©1998, Nortel Corporation, All Rights Reserved.

BACKGROUND

Many computers and other electronic devices today are coupled by local area networks (LANs). Many LANs are designed to transfer data between the electronic devices which are coupled to the network. Each electronic device coupled to the network is referred to as a node on the network. The node implements a communication protocol which is consistent with the other nodes, and defines how data is exchanged, including when data can be exchanged.

One protocol in use in millions of local area networks is referred to as shared Ethernet. It is defined in an IEEE 802.3 standard. The typical implementation of the standard on each node uses a protocol which is based on a carrier sense multiple access/collision detect (CSMA/CD) standard. This means that each node or station on a shared Ethernet segment listens for other traffic before attempting to transmit. If the network is busy, then the node will wait until it is quiet and then it will begin to transmit its own data in the form of packets. Sometimes, two nodes attempt to transmit data at the same time, since neither detected traffic on the network. This results in a collision, which both nodes then detect, and stop transmitting. Following a collision, each node will wait a random amount of time prior to attempting to transmit again. This usually prevents a second collision between the same two nodes. The amount of data that can be transferred in a given time is referred to as bandwidth of the network. If many collisions occur, the effective bandwidth can be reduced.

Millions of shared Ethernet LANs are in existence today. The Ethernet protocol works very well for the transfer of non-real time traffic, since with such traffic, there is no absolute need for data to arrive at a destination at any guaranteed time. However, with the advent of voice communications, there is a need to ensure that traffic arrive in sufficient time to be reconstructed into audio signals in real time. With voice over internet protocol (VoIP) real time conversations take place over an internet connection. Where one person is using a computer which is a node in a shared Ethernet network, with the internet connection provided by another node, voice packets need to comply with the network protocol, yet it is also important that they arrive in time to be reconstructed. There is also a need to handle other forms of real time data, such as video and application critical data in similar networks.

SUMMARY OF THE INVENTION

A node on a collision detection protocol based network forces collisions to gain control of the network when it has real time data that needs to be transferred to another node on the network, and then begins transmitting the real time data prior to other nodes gaining control of the network.

In one embodiment, a node which has real time data to transfer implements an enhanced protocol which keeps track of a maximum wait time parameter to determine when the real time data must be transferred to ensure it arrives at a destination on time. As the maximum wait time is approached, the node forces a collision by transmitting, even though it senses another node is already transmitting, to force the network into a quiet mode. It then starts transmitting the real time data prior to other nodes beginning transmission. This ensures that the real time data will be successfully transferred prior to expiration of the maximum wait time.

In a further embodiment, a second node is connected to a wide area network to further transmit the real time data received from the first node to an intended recipient. The second node is also coupled to the local network and implements the same protocol as the first node to transfer real time data to the first node on time. These two nodes, implementing the enhanced protocol, allow timely transmission of real time data such as audio.

In yet a further embodiment, the enhanced protocol is an enhancement to shared Ethernet which is compliant with IEEE 802.3 as it existed at the time of filing of this application. In still a further embodiment, all other nodes on the network have collision detection timer boundary values set such that the nodes implementing the enhanced protocol can be guaranteed to have shorter time periods for retransmission, thus guaranteeing that the enhanced nodes begin and possibly complete their transactions before the other node(s) return from a quiet state.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description provides a description of a network which implements a protocol to achieve improved real time communications over an existing network, and alternative embodiment. A description of an implementation of the protocol in terms of a flow chart is also provided followed by a conclusion which states some of the potential benefits and describes further alternative embodiments.

Figure 1:
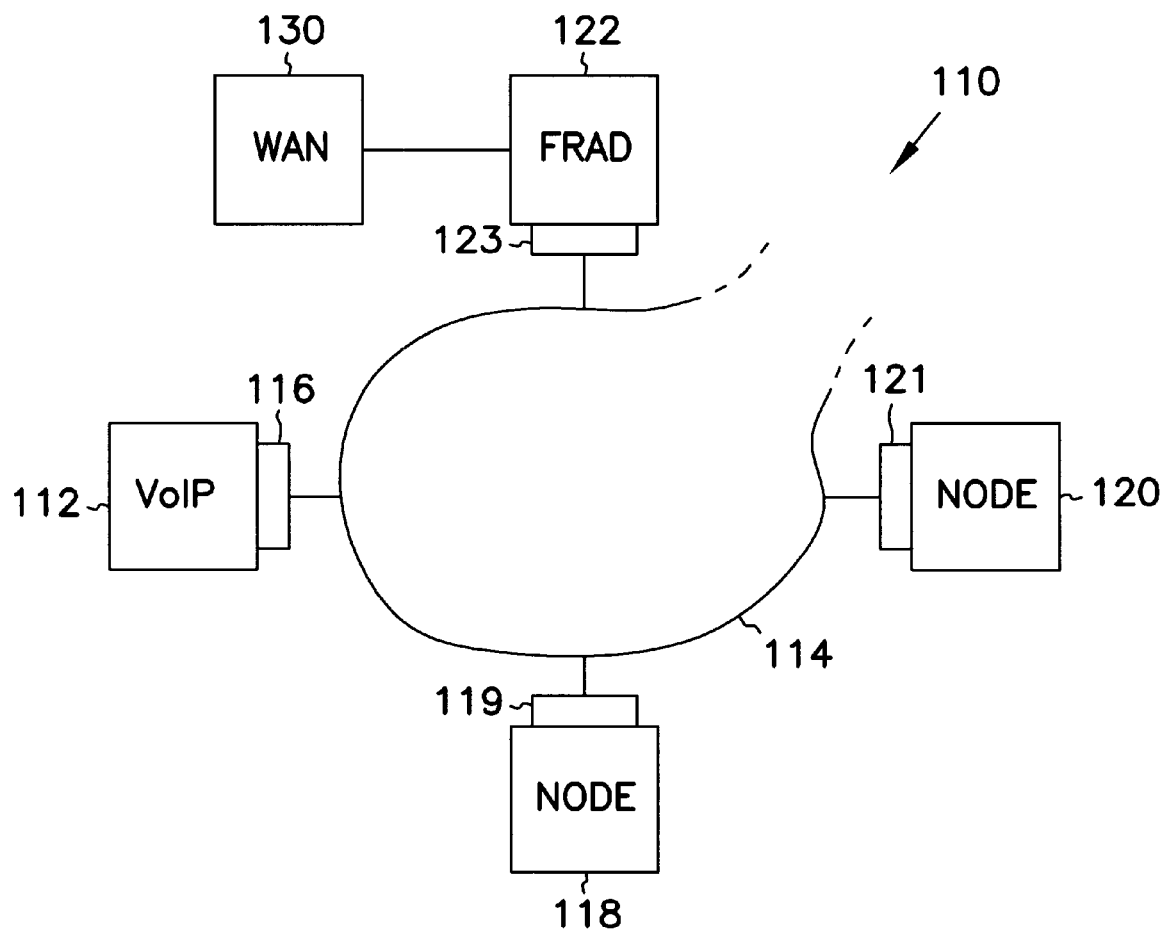
FIG. 1 is a block diagram of a network having multiple nodes in accordance with the present invention.

A block diagram of a network having multiple nodes comprising computer systems or other electronic equipment is shown generally at 110 in FIG. 1. Each node comprises a combination of suitable hardware and software to implement communication protocols as is well known in the art. Enhancements or modifications to existing protocols are hereinafter described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other types of computers, and many different types of electronic devices, including hand-held devices, multiprocessor systems, microprocessor-based programmable consumer electronics, network PCs, minicomputers, mainframe computers, and the like.

A first node 112 comprises a personal computer, which includes a standard processor and random access memory, and further includes a hard disk drive for reading from and writing to a hard disk, and may further include a magnetic disk drive for reading from and writing to a removable magnetic disk, an optical disk drive for reading from and writing to a removable optical disk such as a CD-ROM or other optical medium. The drives and their associated computer-readable media provide nonvolatile storage of computer-readable instructions, data structures, program modules and other data for first node 112. Although the exemplary environment described herein employs a hard disk, a removable magnetic disk and a removable optical disk, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, carrier waves for electronic transmission of data and the like.

Program modules may be stored on computer readable media and may include operating systems, one or more application programs, other program modules, and program data.

Node 112 connects to a local network 114 through a network interface or adapter 116. In one embodiment, adapter 116 comprises an Ethernet card allowing attachment to a shared Ethernet network 114. Further nodes are also coupled to network 114 and comprise nodes 118, 120 and 122. Further nodes may also be connected. Nodes 118, 120 and 122 further utilize Ethernet adapters 119, 121, 123 respectively, which may be the same type as adapter 116. The network is shown with dotted lines on its ends to represent the potential connection of further similar nodes.

In one embodiment, node 112 is a real-time critical device such as a voice over IP (VoIP) gateway server. One other node, such as node 122 is a router and/or frame relay access device (FRAD) that manages access to a wide area data network (WAN) represented by block 130. VoIP node 112 provides real time traffic such as voice or video that needs to be transmitted by a certain time, or the quality of the transmission and playback by a receiver, either on the LAN, or the WAN, will be adversely affected. Shared Ethernet environments allow the potential for long or unpredictable delays, making it difficult to successfully connect and provide suitable service to nodes like VoIP node 112. With the higher demand for such nodes, and the proliferation of shared Ethernet LANs, there is a need for an inexpensive manner of providing such nodes with good service on such LANs. Switching to a switched Ethernet LAN can be much more expensive.

Without modifying other nodes in the shared Ethernet environment 114, the VoIP node 112 and the FRAD node 122 are modified in the following manner. A maximum wait time parameter is established at 210 in FIG. 2 for moving pre identified real-time data items in the form of packets or blocks out of the node and onto the network 114. The real time data and associated MWT parameter are queued on a software or hardware queue, either in the node, such as a personal computer, or network adapter cards. As shown in the flow chart of FIG. 2, the maximum wait time parameter is monitored at 215 for each data item to be sent from the node. As the maximum wait time (MWT) is reached at 220, the network 114 or channel is monitored for traffic. If it is not busy as determined at 225, the real time data item is sent at 230 and monitoring then continues at 215. If the channel was busy, the node checks to see if it had just forced a collision at 235. If so, it knows that another real time data enabled node is transmitting real time data, and it will not interrupt such a transmission. It means that the other node had a shorter time within which to begin transmission following a quiet time. It waits for the transmission to end at 240, and then transmits the real time data at 230 in the next quiet time of the network.

If the VoIP node or FRAD node had not just previously forced a collision at 235, it does so at 245 by transmitting out of turn. Under the Ethernet standard, a node is supposed to wait prior to transmitting. However, by forcing a collision, the node can gain quicker access in order to transmit the real time data. A node that was transmitting detects the collision in accordance with the standard, and stops transmitting. The node forcing the collision also detects the collision as represented at 250 and stops transmitting. The collision thus forces the network into a quite mode. It then begins transmitting as also represented at a collision detection timer 250, after waiting for a shorter period than all the other nodes, and again returns to 215 to monitor the MWT for each of the remaining real time data queued for transmission from that node.

Figure 2:
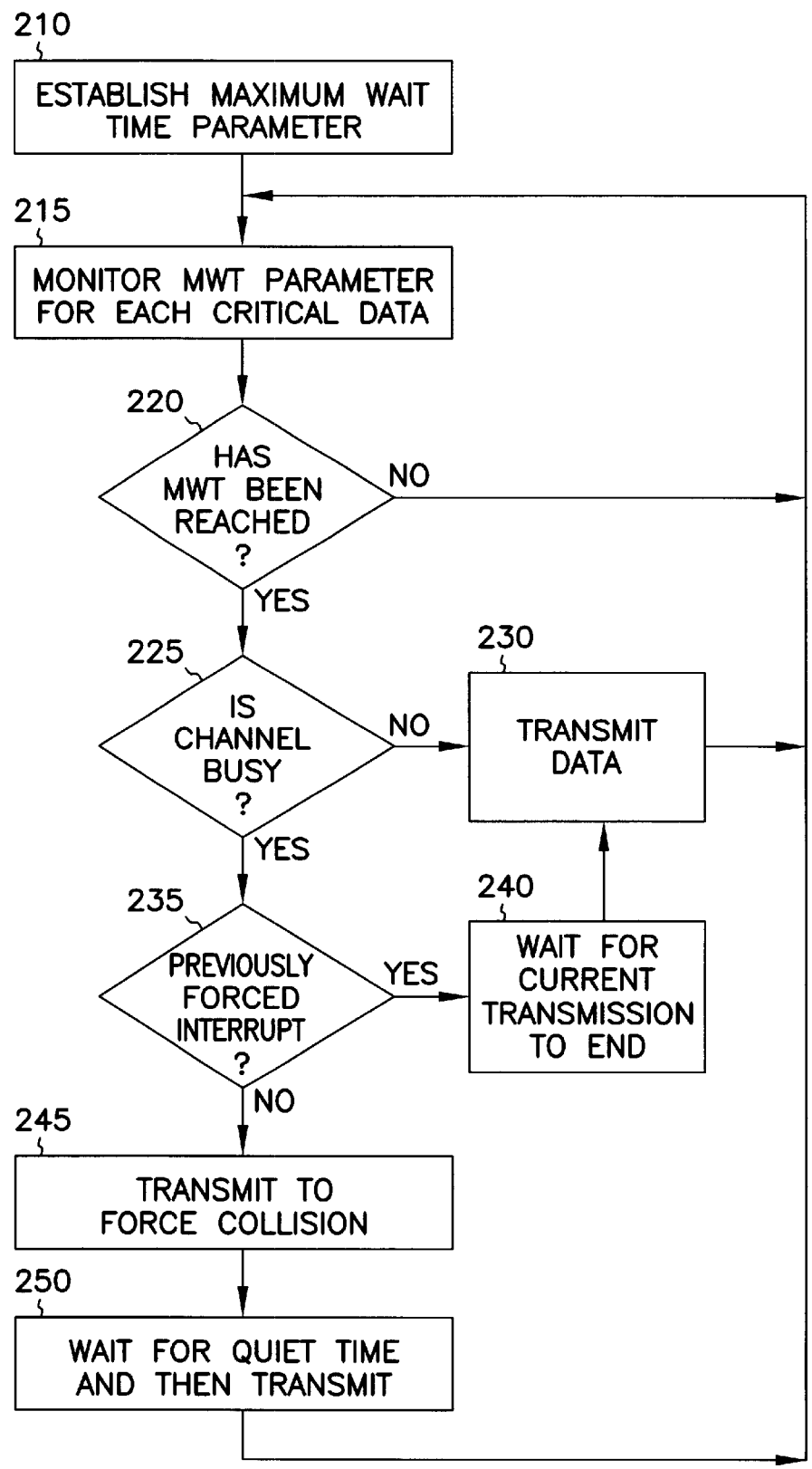
FIG. 2 is a flow chart of the operation of an enhanced communication protocol in accordance with the present invention.

The flow indicated in FIG. 2 can be implemented in software which is stored on computer readable medium. The software comprises computer executable instructions, which may be written in any number of suitable languages such as C++, basic, APL, Fortran or many other procedural or object oriented languages.

Pre configured collision detection timer boundary values for the VoIP and FRAD nodes are set to always be less than any other node on a segment of the Ethernet network 114. The pre-configured boundary parameters are normally used to ensure that the network goes quiet for a random amount of time. By setting the boundary values to a smaller time, one of the nodes which caused the collision will be the first to transmit, thus gaining control of the network and enabling the critical data to be transmitted within the maximum wait time.

The implementation is quite similar for a shared priority Ethernet segment or LAN. If a node having time critical data to transmit determines that the maximum wait time for that data is approaching, it again causes a collision if another node is already transmitting, and the node has an artificially low seed value for a random number timer. This assures that the node will return well in advance of all other nodes and begin the communication/transaction involving the time critical data. If both nodes capable of purposefully initiating collisions have data approaching the maximum wait time, and both initiate a collision, one is predetermined to have even a smaller quiet time, and both nodes are programmed not to cause a collision twice in a row as indicated at 235, and will wait for the end of the current transmission. At that point, it is free to interrupt the next transmission.

The maximum wait time may be determined in many different manners, but is usually determined based on a desired quality of service combined with a knowledge of how much data has already been sent in a known elapsed time and how long that data would take to play. The receiver may also provide indications of where it is in playback, which combined with a knowledge of how long it takes for a transmission to reach the receiver provides the ability to determine the MWT. Further time may be added based on the known time to begin transmission following a forced collision.

Many encodings of voice and video are able to withstand lost data without significantly degrading playback. The maximum wait time may take such factors into account. It may take into account the desire for real time playback versus transmission for later playback.

CONCLUSION

The current invention provides a simple, cost effective way to modify nodes in existing Ethernet networks to support voice over IP nodes. By simply modifying at least one of the nodes to enable it to force collisions and then transmit before the other nodes, real time data may be effectively handled. This application is intended to cover any adaptations or variations of the present invention. It is equally applicable to any type of network where collisions may take place, and retransmission occurs. It is manifestly intended that this invention be limited only by the claims and equivalents thereof.

We claim:

1. A method of transmitting real time data on a carrier sense collision detection network, the method comprising:
   establishing a maximum wait time for a real time data item;
   forcing a collision when the maximum wait time is reached; and
   transmitting the real time data item after the network becomes quiet as a result of the forced collision.

2. The method of claim 1 wherein the real time data item is transmitted following expiration of a collision detection timer.

3. A method of transmitting real time data from one of many nodes on a carrier sense, multiple access, collision detection network, the method comprising:
   queuing real time data items having maximum wait times;
   forcing a collision when the maximum wait time is reached for a real time data item; and
   transmitting the real time data item after a collision detection timer value has been passed.

4. The method of claim 3 wherein the collision detection timer of the node having real time data items has a value selected to be less than that of other nodes.

5. The method of claim 3 wherein the real time data is audio data.

6. The method of claim 3 wherein the network protocol is shared Ethernet.

7. A system for transmitting real time data on a carrier sense collision detection network, the system comprising:
   a queue that identifies packets of real time data and associates a maximum wait time for each packet;
   a monitor that detects when the maximum wait time is reached for each real time data packet;
   a transmitter that forces collisions on the network when the maximum wait time is reached for each packet and transmits the real time packet following a quiet period of the network.

8. The system of claim 7 and further comprising a connector for coupling the system to a network.

9. The system of claim 8 wherein the network comprises a shared Ethernet network.

10. A system for transmitting real time data on a carrier sense collision detection network, the system comprising:
    means for identifying packets of real time data and associates a maximum wait time for each packet;
    means for detecting when the maximum wait time is reached for each real time data packet;
    means for forcing collisions on the network when the maximum wait time is reached for each packet and transmits the real time packet following a quiet period of the network.

11. The system of claim 10 and further comprising:
    means for providing a time at which to begin transmitting the real time data packet in the quite period following a forced collision.

12. A node for coupling to a shared carrier sense, multiple access, collision detection network having multiple nodes coupled thereto, the node comprising:
    a network busy detector;
    a collision detector;
    a collision forcer;
    a collision detection timer having a shorter value than other nodes on the network.

13. The node of claim 12, and further comprising a voice over IP gateway server coupled to the node.

14. The node of claim 13, and further comprising a frame relay access device coupled to the node.

15. A network comprising:
    a plurality of normal nodes implementing a shared Ethernet protocol coupled to the network;
    a first real time data node coupled to the network that has the ability to force collisions and transmit real time data prior to the normal nodes beginning to transmit data following a collision; and
    a second real time data node coupled to the network that has the ability to force collisions and transmit real time data prior to the normal nodes beginning to transmit data following a collision, wherein the first real time data node is a voice over IP gateway server and the second real time data node is a router coupled to a further network.

16. A network comprising:
    a plurality of normal nodes implementing a shared Ethernet protocol coupled to the network;
    a first real time data node coupled to the network that has the ability to force collisions and transmit real time data prior to the normal nodes beginning to transmit data following a collision; and
    a second real time data node coupled to the network that has the ability to force collisions and transmit real time data prior to the normal nodes beginning to transmit data following a collision, wherein the first real time data node comprises a queue having maximum wait times associated with real time data items to be sent.

17. The network of claim 16 wherein the maximum wait time is a function of the time at which such real time data should be received.

18. The network of claim 17 wherein the real time data is voice data.

19. A machine readable medium having instructions stored thereon for causing a computer to perform a method of transmitting real time data on a carrier sense collision detection network, the method comprising:

establishing a maximum wait time for a real time data item;

forcing a collision when the maximum wait time is reached; and transmitting the real time data item after the network becomes quiet as a result of the forced collision.

20. A machine readable medium having instructions stored thereon for causing a computer to perform a method of transmitting real time data from one of many nodes on a carrier sense, multiple access, collision detection network, the method comprising:

queuing real time data items having maximum wait times;

forcing a collision when the maximum wait time is reached for a real time data item; and transmitting the real time data item after a collision detection timer value has been passed.

* * * * *